US006792401B1

(12) United States Patent
Nigro et al.

(10) Patent No.: US 6,792,401 B1
(45) Date of Patent: Sep. 14, 2004

(54) INTERNET-BASED MODELING KIOSK AND METHOD FOR FITTING AND SELLING PRESCRIPTION EYEGLASSES

(75) Inventors: Richard Nigro, Yorktown Heights, NY (US); Werner Kraemer, Conklin, NY (US); Robert J. Holicky, Binghamton, NY (US); Richard B. Mallinson, Binghamton, NY (US)

(73) Assignee: Diamond Visionics Company, Vestal, NY (US)

( * ) Notice: Subject to any disclaimer, the term of this patent is extended or adjusted under 35 U.S.C. 154(b) by 352 days.

(21) Appl. No.: 09/703,215

(22) Filed: Oct. 31, 2000

(51) Int. Cl.[7] .................................................. G06F 7/48
(52) U.S. Cl. ........................... 703/6; 705/26; 705/27
(58) Field of Search ................... 703/1, 6, 2; 705/26, 705/27; 351/227; 345/629, 630

(56) References Cited

U.S. PATENT DOCUMENTS

| | | | | |
|---|---|---|---|---|
| 3,510,210 A | * | 5/1970 | Haney | 352/39 |
| 4,276,570 A | * | 6/1981 | Burson et al. | 382/276 |
| 4,434,467 A | * | 2/1984 | Scott | 700/90 |
| 4,539,585 A | * | 9/1985 | Spackova et al. | 382/100 |
| 4,602,280 A | * | 7/1986 | Maloomian | 382/100 |
| 4,730,260 A | | 3/1988 | Mori et al. | 345/632 |
| 4,731,743 A | * | 3/1988 | Blancato | 345/632 |
| 4,845,641 A | * | 7/1989 | Ninomiya et al. | 352/39 |
| 4,852,184 A | | 7/1989 | Tamura | 382/282 |
| 4,991,005 A | | 2/1991 | Smith | 348/77 |
| 4,996,994 A | * | 3/1991 | Steinhauer et al. | 600/587 |
| 5,060,171 A | * | 10/1991 | Steir et al. | 345/630 |
| 5,280,570 A | | 1/1994 | Jordan | 345/632 |
| 5,515,268 A | | 5/1996 | Yoda | 705/26 |
| 5,539,677 A | | 7/1996 | Smith | 705/26 |
| 5,592,248 A | | 1/1997 | Norton et al. | 351/246 |
| 5,680,528 A | * | 10/1997 | Korszun | 345/630 |
| 5,732,398 A | * | 3/1998 | Tagawa | 705/5 |
| 5,926,247 A | * | 7/1999 | Kimura | 351/41 |
| 5,930,769 A | | 7/1999 | Rose | 705/27 |
| 5,950,173 A | * | 9/1999 | Perkowski | 705/26 |
| 5,974,400 A | | 10/1999 | Kagami et al. | 705/26 |
| 5,983,201 A | | 11/1999 | Fay | 705/27 |

(List continued on next page.)

FOREIGN PATENT DOCUMENTS

WO WO98/52092 * 11/1998

OTHER PUBLICATIONS

Gillenson et al., Information Technology as the Enabler of One–to–One Marketing, AIS, vol. 2, Article 18, Sep. 1999.*

Primary Examiner—W. D. Thompson
(74) Attorney, Agent, or Firm—Malin, Haley & DiMaggio, P.A.

(57) ABSTRACT

An Internet-based optical imaging system to gather anthropometric data for the purpose of enabling national and international commerce in the wearable goods market, including accurate measurement for selecting, fitting, and ordering eyeglasses and eyeglass frames via the Internet that includes vendor support interaction. A customer can view and orient his or her real-time image, wear a sales item on a virtual personal model, and order selected sales item via the Internet access. The customer's 2-D photoimagery/textured 3-D model and logistics data are acquired at a modeling kiosk that, for eyeglasses, includes specific vendor specification items, pupilary, bridge, and temple distances necessary for a specific customer. Internet data paths from the modeling kiosk node to vendor nodes, such as point-of-sale and manufacturers, and the customer's home computer, can-be provided. The system uses at least one digital camera and least one pattern projector to obtain 2-D/3-D imaging simultaneously with the interaction and use of texture generation for extremely accurate measurements.

11 Claims, 6 Drawing Sheets

U.S. PATENT DOCUMENTS

| | | | | |
|---|---|---|---|---|
| 6,032,130 A | * | 2/2000 | Alloul et al. | 705/27 |
| 6,043,827 A | * | 3/2000 | Christian et al. | 345/474 |
| 6,083,267 A | | 7/2000 | Motomiya | 703/6 |
| 6,085,195 A | * | 7/2000 | Hoyt et al. | 707/10 |
| 6,095,650 A | * | 8/2000 | Gao et al. | 351/227 |
| 6,144,388 A | * | 11/2000 | Bornstein | 345/629 |
| 6,231,188 B1 | * | 5/2001 | Gao et al. | 351/227 |
| 6,307,568 B1 | * | 10/2001 | Rom | 345/629 |
| 6,386,707 B1 | * | 5/2002 | Pellicano | 351/246 |
| 6,466,830 B1 | * | 10/2002 | Manross et al. | 700/83 |
| 6,508,553 B2 | * | 1/2003 | Gao et al. | 351/227 |
| 6,533,418 B1 | * | 3/2003 | Izumitani et al. | 351/204 |

* cited by examiner

FIG. 6

INTERNET-BASED MODELING KIOSK AND METHOD FOR FITTING AND SELLING PRESCRIPTION EYEGLASSES

BACKGROUND OF THE INVENTION

1. Field of the Invention

This invention relates to an Internet-based, computer-aided system and method that allows the user to quickly and accurately select eyeglass frames, be accurately fitted for eyeglasses, and purchase the proper prescription eyeglasses, which can be accomplished through a kiosk environment with the ophthalmologist or optometrist, and specifically to an Internet-based modeling kiosk that allows for the fitting, selection, sale, and ordering of prescription eyeglasses, that utilizes the Internet to connect the customer, the manufacturer of the lenses, the manufacturer of the eyeglass frames, and the presiding eye doctor, to greatly reduce the overall cost and increase accuracy and speed of purchase, while reducing inventory and space necessary for providing optical services.

2. Description of Related Art

The sale of wearable goods, such as eyeglasses, clothing, and other individually-sized goods through retail outlet stores results in many stores having huge inventories of goods that are required because of the vast differences in the aesthetic tastes and sizes of human beings for wearable goods. The maintenance of such a huge inventory, including the shipping costs, and the sheer volume of storage space required for the goods, results in greatly increased costs in the production and sale of wearable goods.

A system and method for fashion shopping is shown in U.S. Pat. No. 5,930,769, issued Jul. 27, 1999, to Rose, using a programmed computer and other electronic medium, where the customer essentially provides measurements.

U.S. Pat. No. 5,539,677, issued Jul. 23, 1996, to Smith shows a method and apparatus for measuring foot sizes electronically, which includes tracing the outline of the consumer's foot and an electronic ordering means for ordering shoes.

A method and system for ordering products is shown in U.S. Pat. No. 5,515,268, issued May 7, 1996, to Youda, which allows a customer to select a product from a product list stored in a remote computer system via a communication line.

The manufacture and sale of prescription eyeglasses requires the consumer to typically obtain a prescription from an ophthalmologist, make one or more trips to an optician, where a specific set of eyeglass frames are selected, and the prescription is filled by the optician by grinding special lenses, and then the eyeglasses are subsequently fitted to the user or customer, requiring another trip to the optician.

U.S. Pat. No. 4,991,005, issued Feb. 5, 1991, to Smith, shows a glass frame viewing assembly and method of use, which allows someone to try on various eyeglass frames and observe the result on a television monitor.

U.S. Pat. No. 4,730,260, issued Mar. 8, 1988, to Mori, et al. shows a method for eyewear simulation and a device for its practice. Essentially, a video camera is used that takes a picture of the person and then synthesizes frame information to show different displays of how glasses would look on a person.

U.S. Pat. No. 5,280,570, issued Jan. 8, 1994, to Jordan shows a spectacle image and lens simulating system and method. This system permits a patient to visualize how he or she would look, given a particular choice of spectacle frames.

U.S. Pat. No. 4,852,184, issued Jul. 25, 1989, to Tamura, et al., shows a method and system for spectacles frame image processing and recording, which allows an image of a human face and the glasses frame image to be synthesized by edge processing and color mixing.

U.S. Pat. No. 5,592,248, issued Jan. 7, 1997, to Norton, et al., shows a computerized method for fitting eyeglasses. Digital images of the user's face and head are enlarged to obtain the most accurate measurements with respect to the bridge and temples.

A system and method enabling shopping from home for fitted eyeglass frames is shown in U.S. Pat. No. 5,983,201, issued Nov. 9, 1999, to Fay. The invention described therein shows a method of providing a customer an opportunity to examine on a PC how the customer would, appear wearing different eyeglass frames, fitted electronically to the customer. The invention incorporates, without the benefit of a technician, the use of a digital camera and scaling device, for providing photographs for scaling distances in the photographs to actual distances to provide customer size. Fay also teaches the use of expensive, stereoscopic photographic equipment for obtaining customer data.

Fay also fails to teach an image fitter with data about frames including 3-D representations of the frames that may be selected. This type of data is critical for a customer to see how the frames may look both on a 3-D representation of the customer's head from every angle and from one or more photorealistic 2-D representations. Moreover, Fay teaches a system whereby the customer could obtain the glasses directly from the manufacturer. This system is extremely dangerous because severe physical effects could result from wearing poorly fitted prescription eyeglasses.

Also, although Fay teaches the use of color photography, Fay does not teach making a composite of a person's 3-D image and frame images. Furthermore, Fay does not teach occulting of the glasses by head and hair features, which require high fidelity depth refinement. Also, the use of multiple 2-D images from different views or 3-D imaging is not taught. Moreover, since Fay requires a "scaling device" in obtaining its image, Fay does not teach or suggest a spatially correlated non-gridded image for image composition and presentation.

The present invention, however, is much more accurate and employs the use of a technician when the customer is being fitted at the kiosk. The present invention also includes two or more different 2-D camera shots that may be shot simultaneously for both a 2-D photorealistic view and a 3-D photo textured model. The present invention has a unique method for determining necessary distances and accuracy for frame fitting.

The technician assures that the glasses will be properly fitted, and that proper measurement of critical optometric data is made. In addition, the accuracy of the measurements in the present invention allows a 3-D phototextured image to be more lifelike than that available in the prior art. Also, the 2-D photo composition of the data obtained in the present invention will surpass the realism of the prior art.

The present invention also teaches 3-D modeling of the frames to provide complete information about a pair of frames to the customer. Also, no expensive stereoscopic equipment is needed in the present invention.

BRIEF SUMMARY OF THE INVENTION

An Internet-based system and method for selecting, fitting, and purchasing prescription eyeglasses from a single, small, kiosk, comprising a modeling kiosk for the customer to select and have the glasses fitted while getting a prescription for the proper lenses and for ordering the glasses, said modeling kiosk located at a predetermined location, a plurality of personal computers, one being located at the modeling kiosk, connected to one or more other computers located at the frame manufacturer and the lens manufacturer, all of which are, connected to the modeling kiosk by the Internet.

The modeling kiosk would typically be set up at the ophthalmologist's or optometrist's office and would occupy a very small space.

The eyeglass customer's two dimensional ("2-D") photos and three dimensional ("3-D") textured model and logistics data is acquired at the modeling kiosk that typically can be provided in a very small area in the ophthalmologist's office. The 3-D model facilitates parameter gathering for specific eyeglass specification items required, such as bridge- and temple-distances for the proper fitting of the eyeglass frames. Internet and PC provided data paths from the modeling kiosk node to supply nodes, such as point-of-sale, store: and vendors, and even the customer's home computer node, are provided via the Internet. Databases, database access, and rendering software are provided at each node to facilitate respective functionality, such as the modeling kiosk data processing, server, privacy/security, customer's home-computer data viewing, order placement, and order processing.

Provided at the modeling kiosk will be a 2-D photo gathering and 3-D data gathering and reconstruction system, based on the head of the customer, to receive the eyeglass and frames, computer image processing interface hardware, and image recognition software, Internet access and server system for the modeling kiosk, vendor, and customer nodes, software necessary to implement 2-D photorealistic discrete views and 3-D reconstruction from 2-D image data, automatic generation of a database containing 2-D photo images, 3-D models, texture data, $R_x$ (lens prescription) data, and customer data.

The modeling kiosk will also include. Internet browser compatible graphics user (GUI) interface software for 2-D and/or 3-D viewing in order placement.

Specifically, in each modeling kiosk there will be one or more digital video cameras and one or more light projectors projecting one or more high contrast patterns of a known geometry. The placement and attitude relation ships between the cameras and projectors will be known, and all cameras will be in communication with one computer system. In one embodiment, only one projector will be active at a time. Each camera should be capable of high resolution color, or 640×480 pixels, minimum.

The modeling kiosk and its PC have a unique Internet address. The one or more cameras may be used to gather digital imagery of the subject's head in two exposures taken with a minimal time interval. A first exposure, taken with general illumination rather than a projected light pattern, is used for 2-D photorealistic imagery and/or to provide texture for a 3-D geometric modeling of a subject's head. A second exposure is taken with light only from a pattern projector and is used to gather data for a 3-D point cloud for the 3-D modeling of the subject's head. The 3-D modeling is required for the option of applying photo texture to the image of the subject's head. If the image requested is a photorealistic 2-D image, then the 3-D head model provides positioning and orientation information and occulting information to construct an image of the frames and the head photoimagery. If more than one pattern projector is used, additional exposures with pattern illumination may be optionally added to the sequence. The kiosk PC will provide for the entry of data and database queries via a server to which uploads of customer data from one or more customers is sent.

The 2-D digital imagery, 3-D customer model and texture patterns are stored on a server. The server may be centralized for convenience and for ease in obtaining data. There are separate options for viewing the images derived from the data obtained. One option provides a set of 2-D photorealistic compositions of digital photos of the subject combined with data of the eyeglass frame of interest. This option may have the computation done by the centralized server and have the 2-D image data transmitted to an optometry browser application on the customer's PC. This browser application may also provide other optometric data to the customer. As another option, a 3-D phototextured model composite of the customer wearing the frame of interest may be provided. An application on the server may produce a unified model of the 3-D image of the customer and of the frame of interest and transmit it to the customer's PC. The customer would be able to view the unified model and rotate it. Viewing, moving and rotation of the 3-D model may be accomplished by a function of the browser or with a plug-in, such as a VRML plug-in, to the browser application running on the customer's PC. On subsequent accesses by the customer, it can be automatically determined whether the customer needs another download of the model or if it is still active in his or her PC.

Databases of vendor items are stored at the centralized server for a specialized market online database. This database is comprised of item specifications, such as frames and lenses, and a 3-D model of each item, including texture patterns. A database query system downloads customer requested items for viewing.

The optometry modeling kiosk system includes creating a database and software program that includes data acquisition, image analysis, the construction of a model, such as the customer's head and face areas, suitable for measuring eyeglass in frames, a final 3-D model, and then the final database for that customer.

The method for both the 2-D photorealistic model and the 3-D phototextured model contains the steps of data acquisition, image analysis and untextured model construction. Data acquisition is performed by taking photos in general illumination and with projected pattern illumination. The step of image analysis comprises the obtainment of point cloud data for the contours defined by the projected pattern or patterns. Untextured model construction comprises the step of building a polygonal model. One example of this model would have triangular faces with the members of the point cloud as vertices. Thus, this model may be formed by point cloud triangulation. Mapping texture from the general illumination photos onto the textured model completes the process for the 3-D phototextured model.

The above steps may be done once per kiosk visit. Additional steps, described below, are performed when the customer calls up one or more of the images obtained wearing different frames.

For the 3-D phototextured model, the 3-D model of the selected frame is positioned onto the 3-D phototextured mode, and the registered model or models are transmitted to a subject's PC.

For the 2-D photorealistic discrete view composition, or 2-D/3-D hybrid, the 3-D model of the selected frame is positioned on the untextured model. The superposition of the two models is rendered once for each view for which photos, were taken. For each view, the eyeglass frame pixels not occulted by the head model are transferred to the picture data for that view, replacing the corresponding pixels. The picture data is for all views, modified by the rendering of the frame, are transmitted to the customer's PC.

As an example, a customer will come to the eyeglass-modeling kiosk, which can be located at an ophthalmologist's office in a very small space. The customer is placed in front of the one or more cameras and one or more light pattern projectors, approximately at a location ideal for subsequent data analysis, and will be photographed with his head in one or more positions. In each position, for each camera, there will be a photo taken with general illumination and a photo taken with illumination only from one or more pattern projectors. In the preferred embodiment, the head is kept generally motionless in each position, and the general illumination and pattern illumination photos are taken with the minimum reasonably possible time interval between them, so the exposures are taken with as close to identical head positions Was possible. In another embodiment, a rapid sequence of photos is taken, for example, with a video camera in electrical connection with a frame grabber, while the head is rotated with a generally smooth motion.

In this embodiment, illumination would alternate between general illumination and pattern illumination. The 3-D models obtained from the projected pattern photos on either side of a given general illumination photo would be used to obtain a 3-D head model of interpolated position to correspond approximately to the position of the head for that general illumination photo. This method allows a large number of poses tog be captured in a short time with a single camera.

In the fixed head position procedure, the use of one camera and many fixed head positions is equivalent to the use of many cameras and one fixed head position, or to the use of intermediate numbers of cameras and head positions. For example, locating three cameras at positions rotated about the head at intervals of 60 degrees, while using two head positions related by a 30-degree rotation, is equivalent to using one camera and six head positions at 30-degree intervals, or to using six cameras at 30-degree intervals and only one head position. In all cases, one can display six poses at 30-degree intervals in the final 3-D or photorealistic 2-D presentation. This allows the operator of the kiosk system to trade off economy in number of cameras against speed and convenience in data taking. An advantage of using at least two cameras is that quasi-simultaneous 3-D data from multiple cameras for a single head position can be merged directly into a single head model using world coordinates of the 3-D points, since the geometrical relationships between the cameras is fixed and known to high precision. This gives 3-D data over more of the head surface than can be covered by a single view.

The projector(s) must be displaced somewhat from the camera location(s) to provide a baseline for stereoscopic reconstruction of the 3-D surface of the head, yet not so far that the portions of the head covered by the camera and by the projector do not mostly overlap.

If multiple head positions are used, or particularly if data is rapidly taken during continuous head motion, the rapid application and removal of general illumination may be uncomfortable to the subject's eyes. The need to turn off the illumination may be avoided by using light in mutually exclusive wavelength bands for the general illumination and the projected pattern illumination. The acceptance band of the camera(s) may be switched between these two mutually exclusive bands by, e.g., rotating an optical filter in front of each of the cameras in synchronism with the camera exposures. Such a filter would have two sectors, each one passing only one of the two mutually exclusive wavelength bands. As a practical matter, use of invisible wavelengths, e.g., in the near infrared, for the projected pattern, will interfere the least with natural color rendition in the picture information collected under general illumination. In another embodiment, this wavelength separation may be accomplished by replacing each camera by two similar cameras and a fixed, wavelength-sensitive beamsplitter that locates the two cameras at optically equivalent positions. The use of two cameras allows the two photos, one taken in general illumination, and the other taken with projected pattern illumination, to be taken simultaneously. In the case of photos taken during continuous head rotation, this simultaneity avoids the need to interpolate the position of the 3-D head model between data taken before the general-illumination pictorial data and data taken after it.

The 3-D data around the bridge of the nose, obtained from the pictures taken with projected pattern illumination, will allow the 3-D model of the eyeglass frame selected by the customer to be put into contact with the head in this region. The other points of contact that determine placement of the frame are portions of the external ear that are obscured by the earlobe. To substitute for these points of contact, other points will be determined, through which the temple of the frame must pass. One method of determining such points involves taking additional picture data beyond that described above. In this method, the customer will don a generic eyeglass frame, of a distinctive color, e.g., white, to enable its recognition by automatic image processing. With the customer wearing this frame, additional exposures will be taken, similar to those already taken without the frame. Image processing will find the points at which the temples of the frame disappear, obscured by either earlobes or hair. These points will be transferred to the 3-D models obtained from the exposures taken with the generic frame. By registering these models, on a best-fit basis, with the models obtained without the frame, these reference points will be transferred to the models used to render view of the head. So placed, they may be used to position the models of the frames used to render pictures of the customer wearing his selected frames.

Once the measurement information is obtained, there is a modeling kiosk database generated that includes the customer's name, address, 2-D photo imagery, head model, and texture database.

The system then generates a database for the optometrist's use that includes the PD, temple and bridge and fitting information, along with input for the specific glasses, model, textures, and tints, including the prescription.

The customer may select glasses using face software, or may have already selected frames based on the database at the modeling kiosk.

The order is then sent to the frame manufacturer and the lens manufacturer, if they are different, allowing the vendors to fill the orders and send the glasses back to the modeling kiosk for pickup by the customers.

By using the present modeling kiosk system that provides for extremely accurate selection, fitting, and ordering of frames and the accompanying prescription lenses, a significant volume of space is saved, both at the ophthalmologist's office and at the optician's office, because of the reduced inventory, while oftentimes reducing the number of middlemen who handle the product, again greatly reducing the overall cost to the customer.

Once the initial database has been established for a specific customer, this database can be maintained by the customer in the customer's home PC, and subsequent orders for prescription eyeglasses can be made directly by the customer from his home, which would allow him to go to the optician's to pick up the glasses for the final fit.

Although the system has been shown for fitting of eyeglasses, which are particularly critical as to variations in the shape of people's head, asymmetrical fit problems, bridge sizes, and nose shape differences, the system may be employed for other wearable goods requiring more or less accurate fitting for the user.

It is an object of this invention to provide a modeling kiosk system and method for wearable goods that must be accurately fit to a customer, such as eyeglasses and eyeglass frames.

It is another object of this invention to provide a photo-realistic 2-D image for utmost realism.

It is another object of this invention to provide an Internet e-commerce software and server system that can connect a customer, the manufacturer and other vendors, professional people, such as the optician and ophthalmologist, for selecting, fitting precisely in rapid order for the customer, eliminating the necessary floor space, and inventory-reducing costs.

In accordance with these and other objects which will become apparent hereinafter, the instant invention will now be described with particular reference to the accompanying drawings.

BRIEF DESCRIPTION OF THE SEVERAL VIEWS OF THE DRAWINGS

These figures are illustrative and are not intended to limit the claims to this invention.

DETAILED DESCRIPTION OF THE INVENTION

Figure 1:
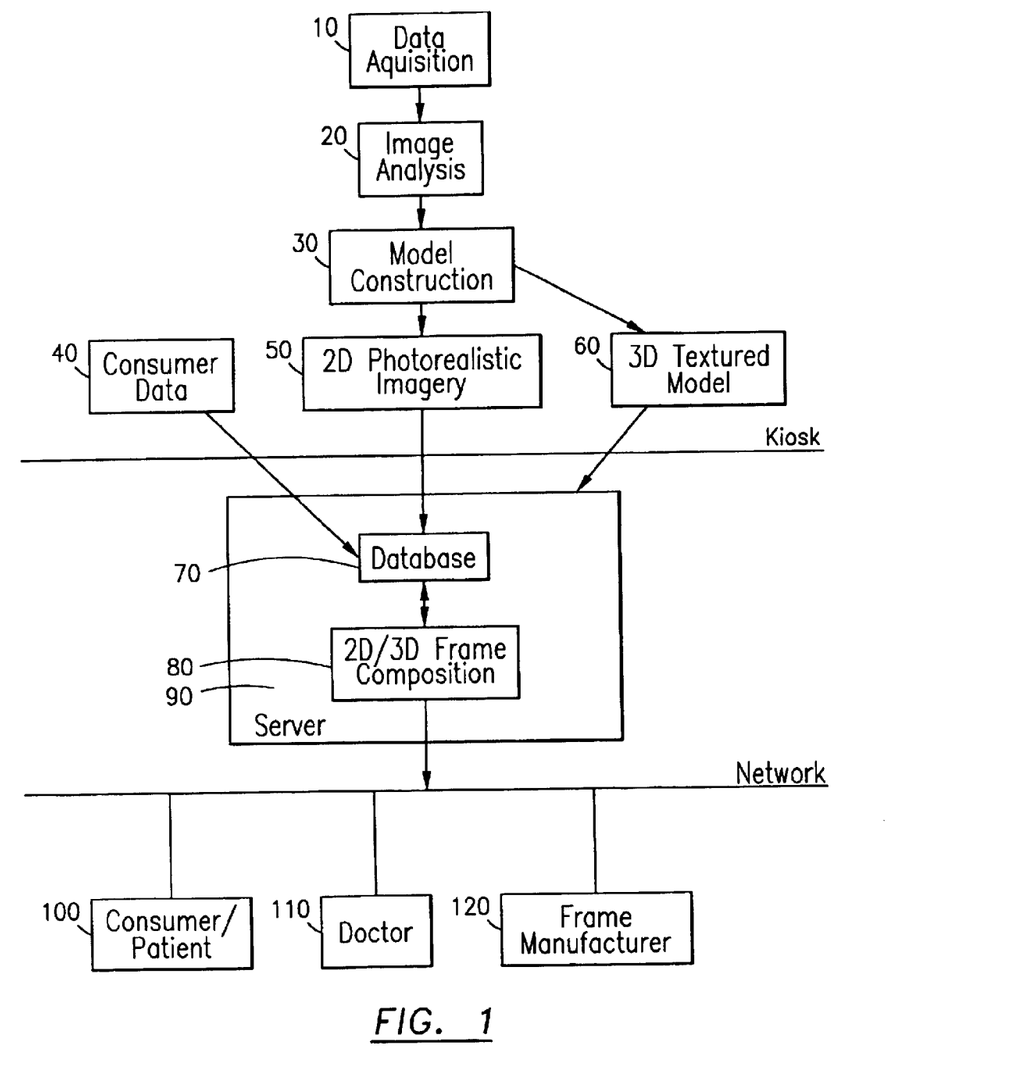
FIG. 1 is a block diagram showing the optometry kiosk system functionally in accordance with this invention.

The invention as shown in the attached figures is a method for the virtual donning of wearable goods, generally described in the flow chart of FIG. 1 at 10. The method first comprises acquiring data 10, including both image data and contour data from a subject. Image data is acquired as described above. The next step is image analysis 20 of the data acquired. This step will perform the contour analysis formulating the 3-D point cloud data and preparing the 2-D photo imagery.

After the data is analyzed and prepared, the model construction 30 begins. This process entails the point cloud data triangulation for the polygonal 3-D model construction. This is a generic process that applies equally as well to other body parts, such as hands for glove selection, or other items of the appropriate size for imaging.

The next step in the process flow is the 2-D photorealistic imagery 50. This is the camera imagery that will be used for the hybrid (2-D/3-D) composition of the 3-D occulted frame data and the discrete view imagery. The 3-D textured model is assembled 60 with the photo imagery and the polygonal model. This phototextured model will be stored at the centralized server database in a conventional open standard 3-D viewing format (e.g., VRML).

The customer data 40, such as point of sale, store and vendors, customer's name, address, access PIN/password, Rx, PD, etc., will be transmitted to the server database via secure WAN (wide area network), which is preferably the Internet.

The remainder of the process flow is preferably outside, though not excluding kiosk access, the Doctor's office. The database 70 will maintain all customer data, the 2-dimensional photoimagery, and the 3-dimensional model with associated texture. The server 90 will be a centralized computer system on the WAN. A PC, such as a Dell Dimension 411 series with a Pentium III at 866 MHz using a network card such as the 3C905C TXM 10/100 Remote Wake Up NIC developed by 3Com, would operate as this server. In addition, the hard drive for the PC would preferably be a 20 Gb Ultra ATA (7200 RPM), and the PC would have minimum 256 Mb of 133 MHz SDRAM. The monitor that would be used for the network system is preferably a 19" (17.9 ", 0.26 dpi) M990 monitor. Equivalent hardware is also contemplated.

Complete kiosk data along with frame manufacturer data will be resident within the secure server database. Software for both the 2-D discrete photo frame composition and the 3-D phototextured frame/head composite model production will reside on the server. Although a 3-D composite model will be produced, the frame model will be articulated so as not to preclude fine frame adjustments at the customer viewing browser. Server access via the Internet will preferably use industry standard encryption for all necessary secure transactions. Account authority/access will use CGI (Common Gateway Interface) scripting software for account/password authentication and/or identification.

Customers 100, the Ophthalmologist or Optometrist 110, and frame manufacturers can access this server through a secure WAN to allow for confidentiality of customer data and the ability to make purchases of the wearable good after viewing and/or selection.

An example of wearable goods selection might proceed as follows. After the modeling visit, a customer will go home with PIN/password for immediate account access. An internet-ready computer/appliance with standard browser capability is all that is necessary to proceed. No specific software/hardware requirements are necessary above and beyond this minimum.

The wearable goods website is called up and displayed. Through the browser GUI (graphical user interface), the process begins. Examples/instructions may begin before and/or after account access. When account verification is accomplished, the customer proceeds. The following will detail a glasses frame selection, but in concept would apply to any wearable goods item. The user will choose between the 3-D phototextured head model and the 2-D photoimagery for frame composition and viewing. If the 3-D model is selected, the server composition software will formulate a composite phototextured model of the head and the currently selected frame of choice. Once produced, this articulated model is downloaded to the browser via secure transmission. Once downloaded, the viewer can rotate and pan/zoom the model using the conventional 3-D browser plug-in of choice. The process repeats itself for all frames of interest. If the 2-D selection is made, a similar process occurs. The currently selected frame request is sent to the server for production. Once received, the server will use the 3-D model momentarily to "wear" the frames in each discrete view. The occulted frame phototextured data is then merged with the corresponding photoimagery representing the same distance/orientation. The resultant 2-D imagery (e.g., gif) data is then sent via the secure WAN to the customer for display in an imager placeholder within the browser GUI. The user can then select between discrete views of already cached image data, through forward/back indicators on the GUI.

If frame selection is made, a secure electronic commerce transaction will take place. Purchase means along with database records will be forwarded to the server for further routing to frame manufacturer, lens manufacturer (if not the same), ophthalmologist or optometrist, and for invoice verification back to the customer.

In the present invention, the subject's 3-D data (such as full body, or portions of the body like head, hands, and feet) are acquired and databased at a kiosk. The functional elements of the kiosk may include imaging equipment, sensors, Internet communications hardware and software, and a data acquisition terminal. The preferred Internet communications hardware and software is the hardware and software described above. In one embodiment, data such as payment method, address, and prescription data for eyeglasses is entered manually or electronically at the data acquisition terminal. The Internet serves as a data path between the kiosk, the vendor or manufacturer and the subject nodes.

Figure 2:
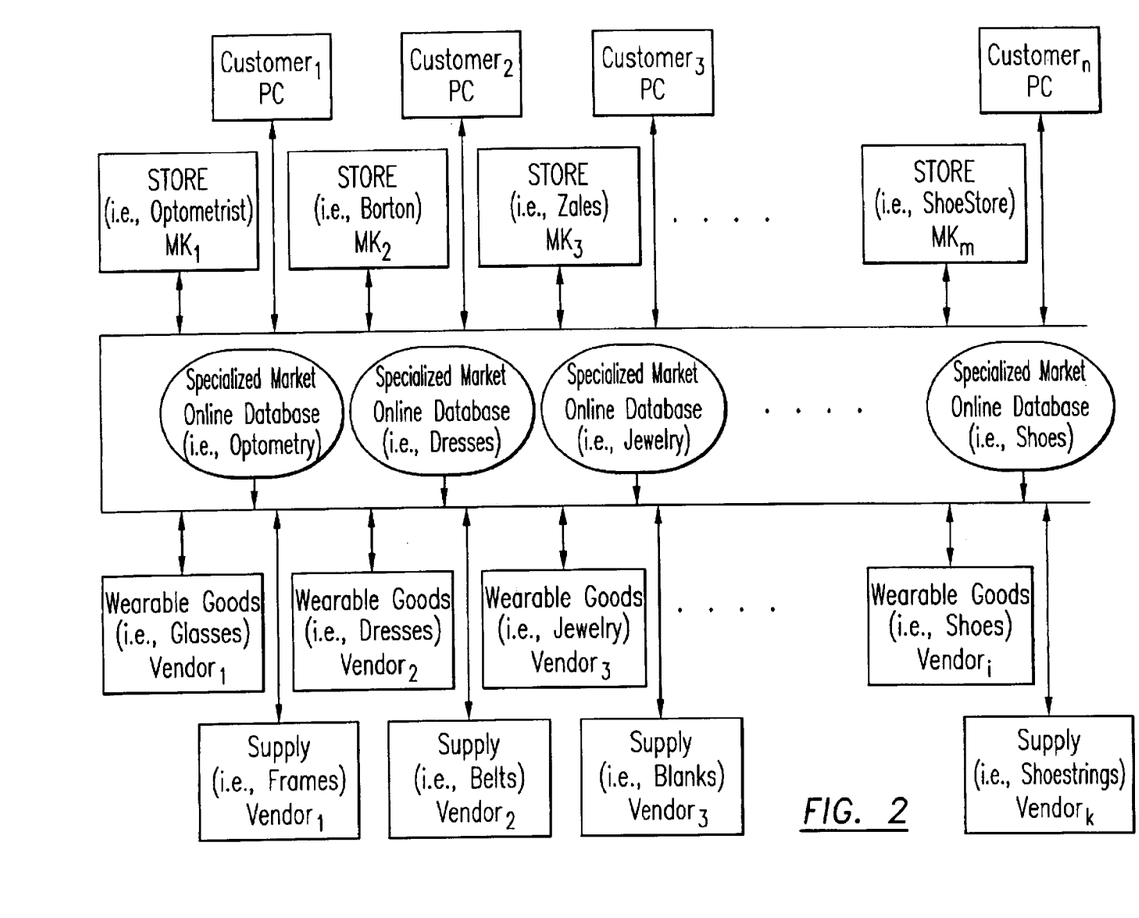
FIG. 2 is a schematic diagram and flow chart showing the Internet relationship between the customers, the stores, and vendors, and the specialized market online database.

The scope of the present invention is illustrated in FIG. 2. As shown, several specialized databases for wearable goods 200 are contemplated. A subject would obtain the 2-D photoimagery and the 3-D phototextured model at a kiosk at a store 204 such as an optometrist's office. Although the term optometrist is used throughout the disclosure of this invention, the term as used is intended to apply equally to an ophthalmologist or other professional properly licensed to fit prescription eyeglasses. The subject then virtually wears the wearable goods via a PC 202, such as the subject's own PC.

Thus, the subject may virtually wear the goods in the privacy of the subject's home or at times convenient to the subject. The subject then could even decide to order the wearable goods. At the same time the subject orders goods, such as glasses from the optometrist 204, the order is also given to the retail vendor of goods such as eyeglass frames 206 and the supplier of the goods, i.e., the eyeglass frames 208. The supplier 208 can then ship the necessary; supply to the appropriate retail vendor. Furthermore, suppliers of accessories to the goods sold by the retail vendors may be included in the system. For example, a supplier of blanks 210 could receive the order from a jewelry customer 212 for a retail jewelry store 214. As shown in FIG. 2, this invention would be useful in the sale and distribution of goods such as glasses, dresses, jewelry and shoes. Clearly, this model is contemplated for all wearable goods.

Figure 3:
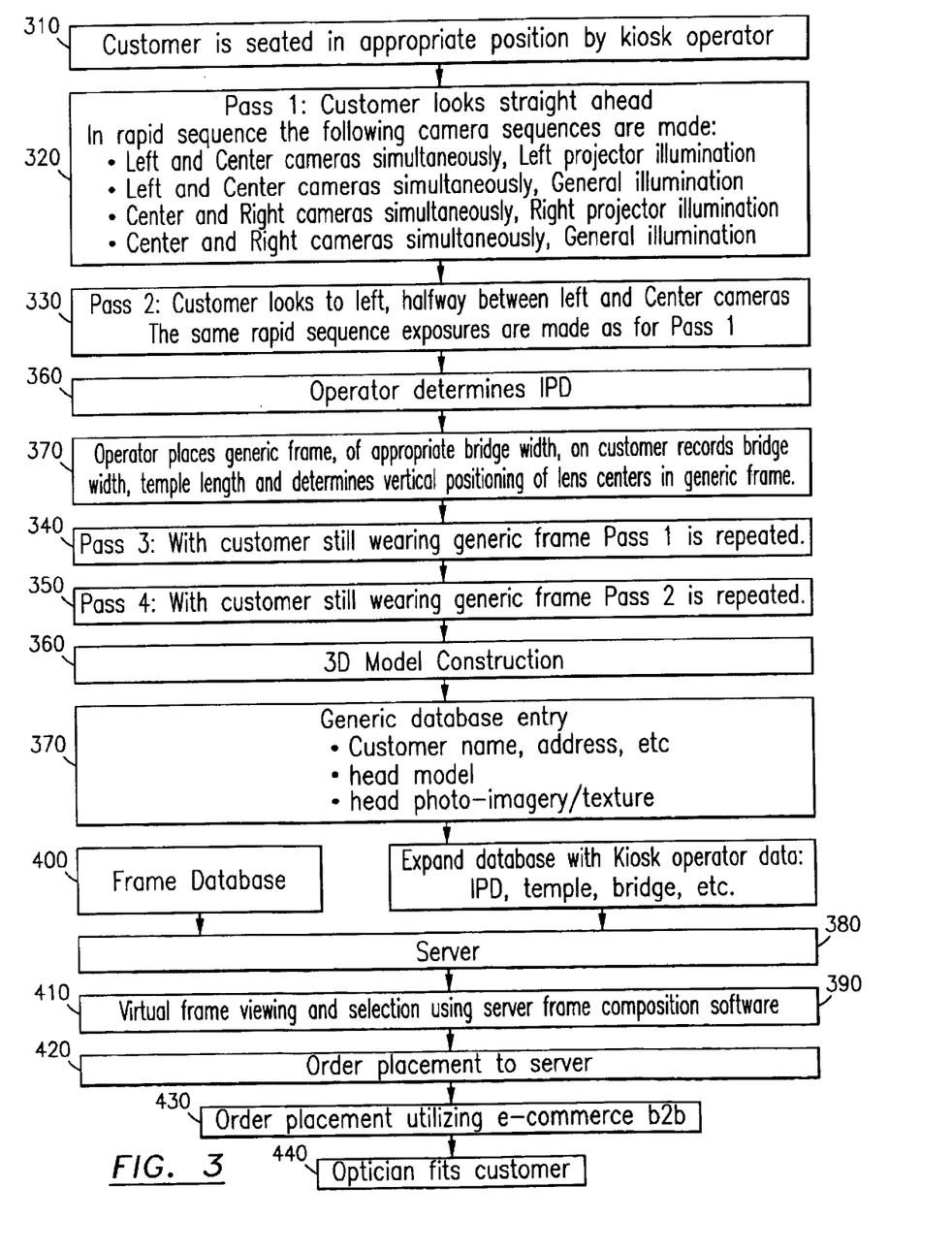
FIG. 3 shows a flow chart of the steps required to provide proper measurement for eyeglass frames in the modeling kiosk.
Figure 4:
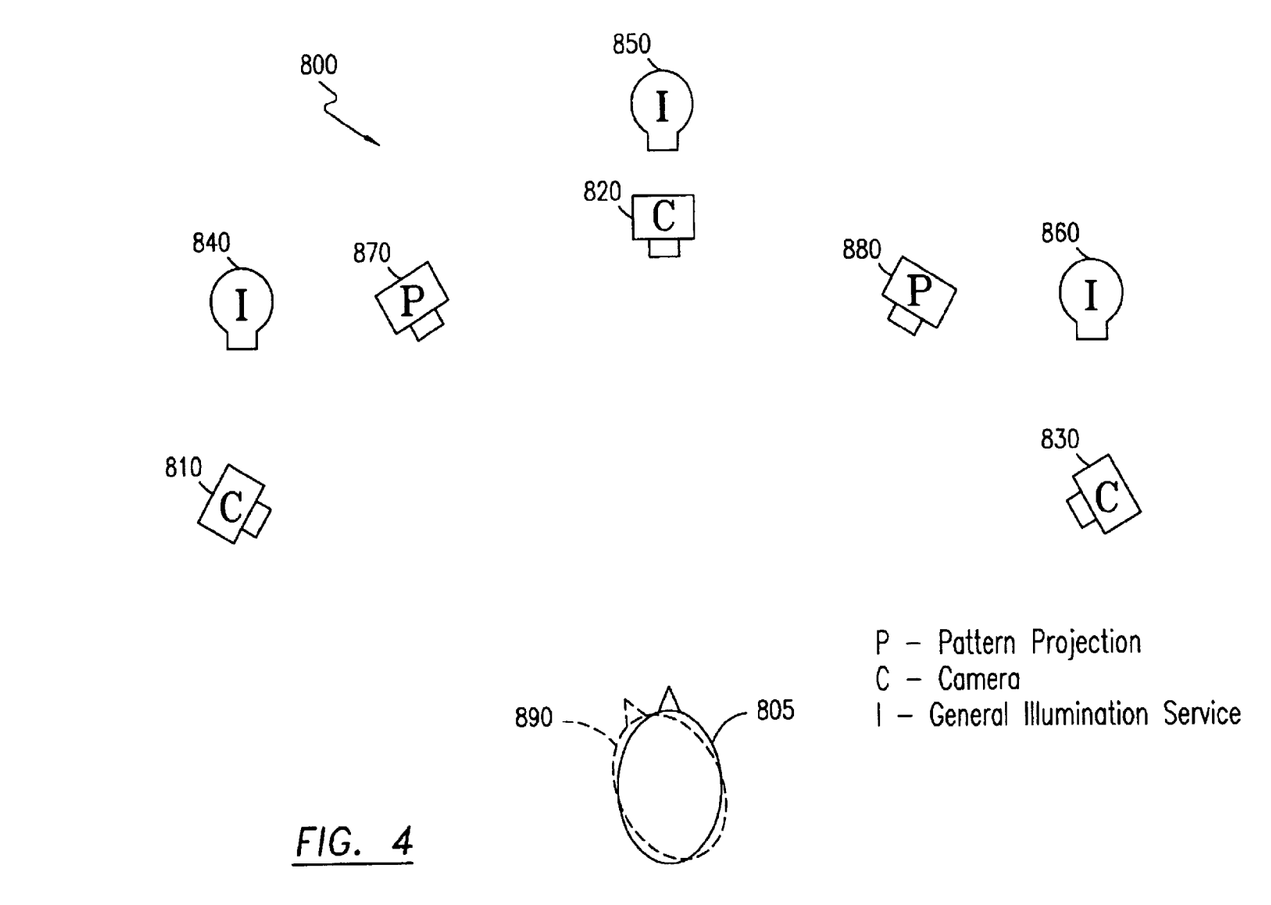
FIG. 4 shows a schematic top view diagram representing a customer or patient interacting with the cameras, general illumination and pattern projectors located in the modeling kiosk in accordance with one embodiment of the present invention.

FIGS. 3 and 4 illustrate the preferred method 300 for obtaining image data for one or more 2-D photorealistic images and for one or more 3-D phototextured models via a kiosk 800. The first step for data acquisition is the positioning of the subject 805 in the appropriate position 310. The data acquisition will then be accomplished by four camera passes, 320,330,340,350. The placement of cameras, illumination and the subject are generally illustrated in one embodiment of the invention in FIG. 4. Three cameras, a left camera 810, a center camera 820, and a right camera 830 are used in the preferred embodiment. However, more cameras may be used, a single camera may be moved around the subject, or the subject 805 may rotate while one or more cameras either remain in position or rotate in the opposite direction as the subject 805.

As shown in FIG. 4, general illumination sources 840, 850,860 are strategically placed within the kiosk 800 around the subject 805 to provide optimal lighting for imaging. Although three general illumination sources 840,850,860 are illustrated, more or less lights may be used, so long as light is optimized for the imaging process. In addition, in the preferred embodiment, two pattern projectors, a left projector 870 and a right projector 880, are placed around the subject 805. However, one pattern projector may be used, and three or more pattern projectors may also be used. For the first camera pass 320, the subject 805 first faces straight ahead. The left camera 810 and the center camera 820 take images of the subject 805 simultaneously with illumination from the left pattern projector 870. The left camera 810 and the center camera 820 take images of the subject 805 simultaneously with general illumination. The center camera 820 and the right camera 830 take images of the subject 805 simultaneously with illumination from the right pattern projector 880. The center camera 820 and the right camera 830 take images of the subject 805 simultaneously with general illumination. These images may be taken in any order.

A second camera pass 330 is made. In the illustrated embodiment, the subject 805 looks to the left side 890, approximately half way between the left camera 810 and the center camera 820. However, the subject may look to the right side. The same exposures are taken as for the first pass 320. From the data obtained, the operator of the system 100 determines the pupillary data of the subject 805 in step 360.

The operator then places a generic frame on the customer 370. The generic frame is of the appropriate bridge width for the subject 805, and the operator records the bridge width and temple length and determines the vertical positioning of the lens centers in the generic frame.

A third pass is completed 340 with the customer wearing the generic frame. The images taken for the first pass 320 are repeated.

A fourth pass 350 is taken with the subject 805 still wearing the generic frames. In the fourth pass 350, the subject's head is turned as it was in the second pass 330, and the steps for taking images in the second pass 330 are repeated.

From the data obtained above, a 3-D model is created 360. A database is then generated 370. The database may include information such as the customer name, address and related contact information. The database will also have the head model to be used in creating the images of the subject 805 and the photoimagery and texture information obtained from the subject 805. This database is expanded 380 with information from the kiosk 800, including information such as pupillary distance, temple distance, and bridge distance.

This expanded database is communicated to the server 390. In addition, the database for the frames is also communicated to the server 400. The subject, using server frame composition software, may perform 2-D and/or 3-D viewing of the frames with the obtained imagery and select frames for purchase 410. The subject then may place an order with the server 420. The order, using business to business e-commerce applications known in the art, may be placed with the appropriate manufacturers and suppliers 430. After the order is placed and filled, the optician then can fit the eyeglasses on the subject 440.

Figure 5:
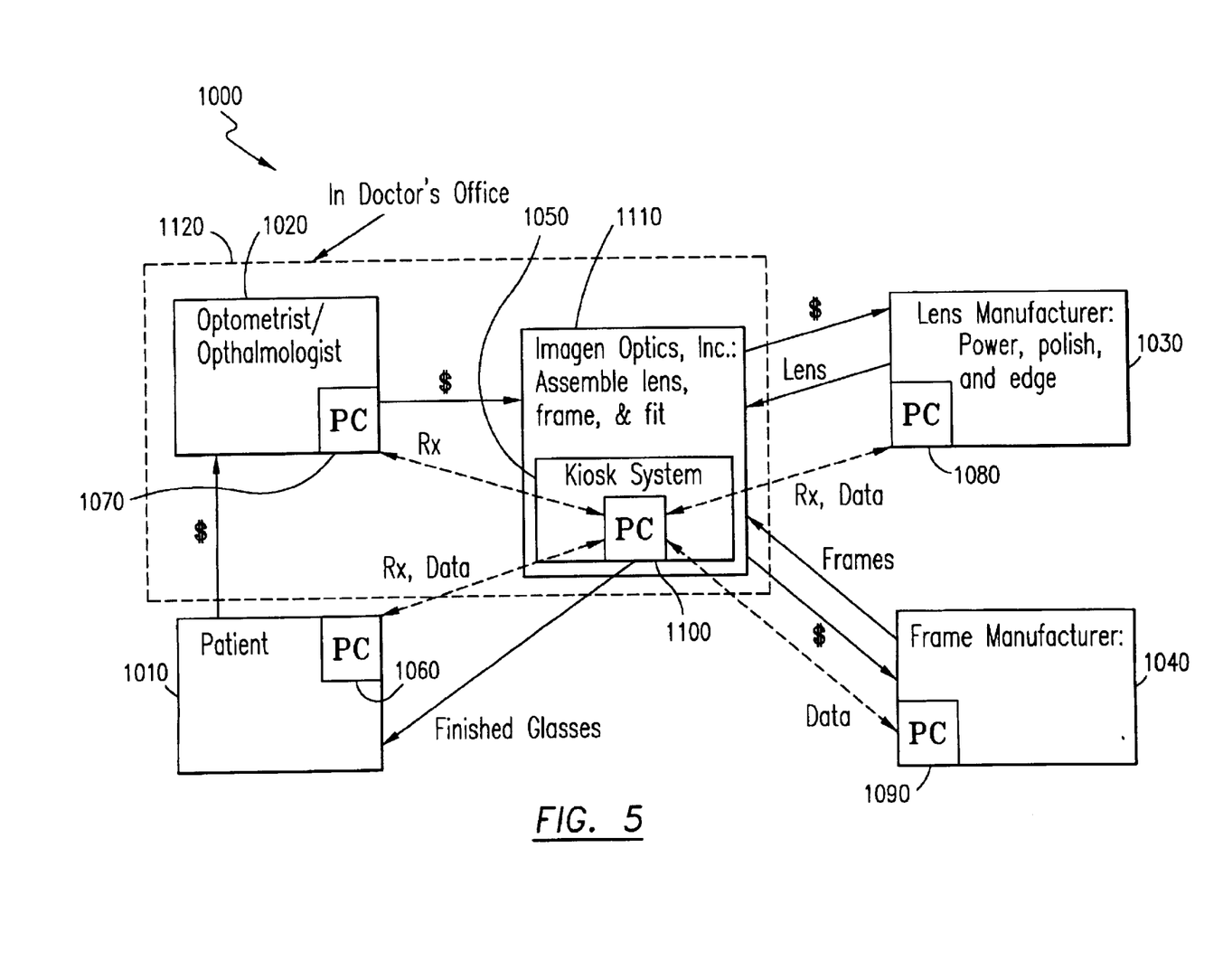
FIG. 5 shows a block diagram and flow chart of information between the ophthalmologist, the lens manufacturer, the frame manufacturer, and the patient, relative to the kiosk system.

This invention also comprises a unique method of selling glasses described in FIG. 5 and generally referred to as 1000. As shown, the subject 1010, the optometrist 1020, the lens manufacturer 1030 and the frame manufacturer 1040 are all interconnected through the kiosk system 1050. As shown, part of the interconnection comes directly through the PCs 1060,1070,1080,1090,1100 of the interconnected parties. In one embodiment, the kiosk system 1050 is owned by an assembling entity 1110 and is physically located within the optometrist's office 1120.

As shown, the subject's eyeglass prescription is relayed between the subject 1010, the optometrist 1020 and the lens manufacturer 1030 through the kiosk system 1050. The kiosk system 1050 provides the subject with the 2-D photoimagery and/or textured 3-D model which can be loaded onto the subject's PC 1060. In the context of eyeglasses, the subject 1010 searches for frames in accordance with frame data provided by the frame manufacturer 1040. The subject accesses the frame data through the kiosk system 1050. Money for the optometrist's services and the finished eyeglasses is paid directly to the optometrist 1020. The money is then distributed to the assembling entity 1110. Money may be paid by cash, debit card, credit card or other electronic means. Money corresponding to the subject's order is then distributed to the lens manufacturer 1030 and the frame manufacturer 1040. Alternatively, the subject may pay directly into the kiosk 1050, which would distribute funds to the optometrist 1020, lens manufacturer 1030 and the frame manufacturer 1040. As shown in FIG. 5, when the lens manufacturer 1030 receives the subject's order for eyeglasses on its PC 1080, the manufacturer 1030 may then provide the lens to the assembling entity 1110, properly polished and edged for the frames that the subject selected. Simultaneously with the lens manufacturer 1030, the frames manufacturer may receive the subject's order on its PC 1090. The frames manufacturer may then provide the frames to the assembling entity 1110. The assembling entity 1110 then provides the assembled eyeglasses to the optometrist 1020, who fits the eyeglasses for the subject 1010.

An important consideration in fitting prescription eyeglasses is to deal with variable lenses that include different degrees of optical differences, such as bifocals, and more particularly, Varilux lenses, which blend different optical strengths and have a very specific, precise distance upon which the lenses must relate to the pupil. Using special texture for frames and frame shape database information, an important distance of 18 mm can be discerned by looking at the shape of the frame and the texture of the frame to figure out the proper pupil location, so that when the eyeglasses are fitted properly, the 18 mm distance will be properly aligned, so that a variable lens, such as a Varilux lens, will be accurately fitted for the wearer. This can be provided in the initial image recognition and 3-D texture mapping that includes selection of a particularly shaped frame and the dimensions of the frame relative to the pupil eye points created while the glasses are being fitted.

Figure 6:
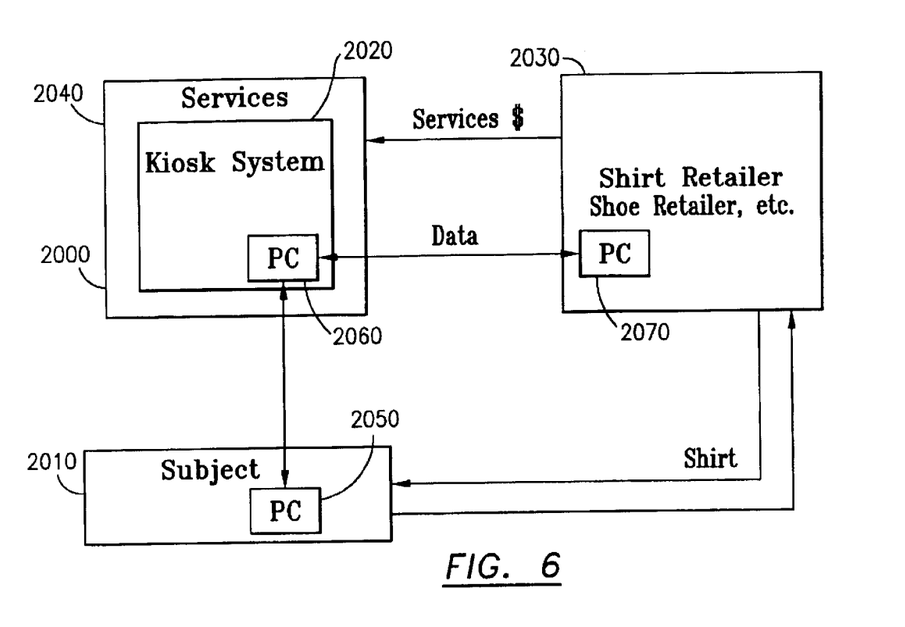
FIG. 6 shows a block diagram and flow chart relating to general services, the kiosk system, and retailers.

As shown in FIG. 6, the system 2000 may easily be adapted for the virtual putting on of other wearable goods, such as a shirt. For example, a subject 2010 may obtain 2-D photoimagery/3-D textured model of his or her head and torso in the manner described above through a kiosk system 2020 operated by a service provider 2040. The 2-D/3-D data may be accessed by the subject's PC 2050. The subject 2010 then uses the kiosk system 2020 to virtually wear a 3-D model of a shirt that has been input into the kiosk system 2020. The information for the 3-D model of the shirt may come from a specific shirt retailer 2030. The subject 2010, through his or her PC 2050, may order a selected shirt through the kiosk system 2020 through its PC 2060 to the shirt retailer 2030 to its PC 2070. The 2-D photoimagery/3-D textured model of the subject's head and torso would be so precise to permit uniquely accurate tailoring of the shirt by the shirt retailer 2030. The subject 2010 then pays the shirt retailer 2030 directly for the shirt. The shirt is directly shipped to the subject 2010. In the preferred embodiment, the shirt retailer 2030 pays the service provider 2040 that provides the kiosk system 2020 a service fee for use of the kiosk system 2020. The system described is also suitable for the virtual wearing and purchase of shoes, jewelry, hats and other wearable goods.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for the virtual wearing of eyeglasses, in order to reduce the inventory required by an opthamologist, optometrist or optician for selling eyeglasses comprising:

acquiring data including image data from a subject in a kiosk, including the steps of initially on a one time basis only having the subject look straight ahead and provide left and center two-dimensional camera images simultaneously and left projector illumination, left and center camera images simultaneously and general illumination, center and right camera images simultaneously and right projector illumination and center and right camera images simultaneously and general illumination during a first pass and providing a second pass where the subject looks to the left half way between center and left cameras making the same rapid exposures as for pass one, and having the operator determine the IPD including the operator placing a generic eyeglasses frame of appropriate bridge width on the subject and recording bridge width, temple length and determining vertical positioning of lens centers in a generic frame, providing a third pass with the subject still wearing the generic eyeglass frames and repeating pass one and providing a fourth pass with the subject still wearing the generic eyeglass frames repeating pass two;

providing image analysis from the data acquired;

constructing one or more virtual models of the subject;

creating two-dimensional photorealistic imagery and a three-dimensional textured model by using a said two-dimensional camera;

inserting the two-dimensional photorealistic imagery and the three-dimensional textured model into a database on a server; and correlating the two-dimensional photorealistic imagery and the three-dimensional textured model with two-dimensional imagery of one or more frames and three-dimensional imagery of one or more frames, whereby the subject's eyeglass measurements are retained in the database model for future use and include three-dimensional imagery of the subject with generic frames.

2. The method of claim 1, wherein the step of acquiring image data from a subject comprises:

placing the subject in front of one or more pattern projectors and one or more cameras.

3. The method of claim 2, wherein three cameras are placed around the subject, and one pattern projector is placed between each camera.

4. A method for providing eyeglasses in order to reduce the inventory required by an opthamologist, optician or optometrist which includes providing a kiosk at the opthamologist, optician or optometrist's office to reduce the cost of eyeglasses comprising the steps of:

acquiring data for a two-dimensional photorealistic image and a three-dimensional textured model of a subject's head at a kiosk by providing a series of passes in front of left and center two-dimensional cameras and center and right two-dimensional cameras simultaneously including left and right projector illumination wherein pass one the subject looks straight ahead, wherein pass two the subject looks to the left, wherein an operator places a generic eyeglass frame of appropriate bridge width on the subject and records bridge width, temple length and determines vertical positioning of lens centers in a generic frame and then including a third pass with the subject wearing the generic frame repeating pass one and a fourth pass with the subject wearing a generic frame repeating pass two in order to create the three-dimensional textured model from two-dimensional cameras;

creating a two-dimensional photorealistic image and a three-dimensional textured model by using a said two-dimensional camera;

communicating the two-dimensional photorealistic image and the three-dimensional textured model to the subject;

communicating a database of two-dimensional photorealistic images and three-dimensional textured models of eyeglasses to the subject; and allowing the subject to order at least one pair of eyeglasses via a personal computer, wherein the order is mirrored at the kiosk, at the frame manufacturer and at the lens manufacturer.

5. The method of claim 4, wherein the kiosk is located at an office, and the frame manufacturer is able to send ordered frames directly to the office, and the lens manufacturer is able to send ordered lenses directly to the optometrist's office.

6. A method of obtaining two dimensional photorealistic imagery and three dimensional imagery providing accurate measurements of the subject purchasing eyeglasses including frames for the selection and purchase of eyeglasses to reduce inventory and for direct ordering from the lens factory and the frame factory comprising:

acquiring data including image data from a subject in a kiosk including having an operator that places a generic eyeglass frame of appropriate bridge width on said subject and records the bridge width, the temple width and determines vertical positioning of lens centers in said generic frame using one or more two-dimensional cameras in multiple positions and getting a plurality of photograph of the subject with the subject looking straight ahead and subject looking in different directions with and without the generic eyeglass frame on the subject in order to create a three-dimensional model;

analyzing the image obtained from the data acquired;

constructing one or more models of the subject;

creating two-dimensional photorealistic imagery and a three-dimensional textured model;

inserting the two-dimensional photorealistic imagery and the three dimensional textured model into a database on a server; and correlating the two-dimensional photorealistic imagery and the three-dimensional textured model with two-dimensional imagery of one or more eyeglasses and eyeglasses frames and three-dimensional imagery of one or more eyeglasses and eyeglasses frames using the subject data obtained from the generic frame.

7. A system that allows a user to obtain an examination from the opthamologist, obtain a lens prescription, quickly and accurately select eyeglass frames, be accurately fitted for eyeglasses in order to greatly reduce the overall cost of frames and prescription glasses by essentially eliminating opticians and the need for large inventory of frames for administration by an opthamologist or optometrist within the opthamologist office comprising:

a kiosk positioned within an opthamologist/optometrist office space, the kiosk including three-dimensional imaging cameras and lighting to permit photographing of a human head with eyeglass frames to create a three-dimensional textured human head model with eyeglass frames for increased accuracy showing different views of the same human head;

a generic frame of a appropriate bridge width that is mountable on a subject to record bridge width, temple length and vertical positioning of lens center in the generic frame relative to the object for creating in conjunction with the imaging cameras and lighting the three-dimensional textured human head model with the generic eyeglass frames;

a personal computer having a data base for receiving and storing such three-dimensional human head model image and frames for accurate measurements;

a lens and frame manufacturer;

a personal computer with a internet connection positioned at said manufacturer's plant and connectable to said opthamologist kiosk personal computer for receiving three-dimensional human head modeling for frame selection and fitting at said manufacturing site;

said data base including information concerning the lens prescription required, the frame selected and the three-dimensional image description each categorized for a specific user with sufficient information to manufacture the frame and lens prescription described in the data base sent from the opthamologist to the manufacturer.

8. A system for selecting prescription eyeglasses as in claim 1 that eliminates the optician and frame inventory in the opthamologist's office including:

an eyeglass user personal computer including a data base for receiving said three-dimensional modeling information concerning the user's human head model and frame model at the user's designated location which could include a home or office;

said three-dimensional modeling data base also including a data base and application program for accessing internet information concerning other available frames available by the manufacturer;

said three-dimensional modeling using the operator generated subject data of bridge width, temple length and vertical positioning of lens centers in a generic frame from the generic frame images and permitting the user at the user's designated site to view a plurality of eyeglass frames virtually on the user's head model that permits the user to send a desired frame selection to the manufacturer who already has data of the three-dimensional model and lenses prescription required by the user at the manufacturer's site.

9. A method to provide a user to quickly and accurately select eyeglass frames that can be accurately fitted and purchased in an opthamologist/optometrist office without the need for an optician and without the need for large inventory of frames comprising the steps of:

providing a kiosk at the opthamologist/optometrist office that includes photo-imaging equipment and a generic eyeglass frame of appropriate bridge width to record direct subject bridge width, temple length and determine vertical positioning of lens centers in said generic frame relative to a subject to provide a three-dimensional model of a human head including virtual eyeglass frames from a variety of different poses and angles to obtain an accurate three-dimensional of the intended user's head and facial texture with eyeglass frames while positioned in said opthamologist kiosk;

providing a selection of frames for viewing by the intended user of the frames;

constructing and providing data acquisition image analysis and model construction for two-dimensional photo-realistic imagery and three-dimensional textured models from the image generating system on a human user to create a data base that includes two-dimensional and three-dimensional head and frame modeling of a particular user;

providing consumer data that relates to the specific user and joining it with the user's two-dimensional and three-dimensional head and frame model of the user's head for fitting eyeglass frames;

providing a frame manufacturer with a personal computer that includes a data base for receiving the data base that includes the user two-dimensional and three-dimensional head and frame model and consumer data from the opthamologist/optometrist personal computer in order to manufacture and provide eyeglass frames that are specifically manufactured to the specification and measurements provided in the consumer data two-dimensional and three-dimensional head and frame model sent to the manufacturer of the frames from the doctor's office; and sending the proper frames from the frame manufacturer for the specific user to the opthamologist office thereby eliminating a large inventory of frames in the opthamologist office and eliminating the need for an optician or an optician's warehouse.

10. A method for eliminating an optician and optician's inventory of frames by establishing a frame selection and measuring station in a kiosk at the opthamologist office comprising the steps of:

establishing a three-dimensional texture imaging system in a kiosk at an opthamologist's office for obtaining extremely accurate three-dimensional head views for accurate frame measurement for eyeglasses in the opthamologist office kiosk that includes an operator placing a generic frame of appropriate bridge width on the subject to record bridge width, temple length and determine vertical positioning of lens centers in a generic frame specifically for the subject on a one-time basis that also includes taking several camera imaging passes of said subject with and without said generic lens for the construction of the three-dimensional image;

establish the consumer data three-dimensional image data base in a personal computer located in the opthamologist kiosk;

communicating over a network with a personal computer established at a frame manufacturer's location for sending the three-dimensional data concerning the textured model of a human head with the frames and consumer data concerning the required frames to the manufacturer's site and personal computer;

ordering the desired frames to be built by the manufacturer and sent to the doctor's office from the doctor's office personal computer kiosk.

11. A method as in claim 10 including the steps of:

receiving the frames from the manufacturer at the doctor's office specifically for the consumer; and fitting the consumer with the new frames received from the manufacturer.

* * * * *